United States Patent Office 3,813,428
Patented May 28, 1974

3,813,428
PRODUCTION OF MONOCARBOXYLIC ACIDS
Frank E. Paulik, Houston, Tex., and Arnold Hershman, Creve Coeur, Walter R. Knox, Town and Country, and James F. Roth, Creve Coeur, Mo., assignors to Monsanto Company, St. Louis, Mo.
No Drawing. Continuation of application Ser. No. 752,794, Aug. 15, 1968, which is a continuation-in-part of applications Ser. No. 628,578 and Ser. No. 628,581, both Apr. 5, 1967, all now abandoned. This application June 15, 1972, Ser. No. 263,332
Int. Cl. C07c 51/12
U.S. Cl. 260—532
18 Claims

ABSTRACT OF THE DISCLOSURE

The present invention relates to a process for the preparation of monocarboxylic acids, specifically by the reaction of alcohols substituted at the alpha carbon atom, having the formula R—$CH_2OH$, and having from 2 to 30 carbon atoms, where R is phenyl or hydroxymethyl; and halogen derivatives thereof in which the OH radical is substituted by Cl, Br, or I; ester derivatives thereof in which the carboxylic acid moiety of the ester has from 1 to 20 carbon atoms; and ether derivatives thereof; with carbon monoxide in the presence of catalyst compositions essentially comprising rhodium or iridium compounds and complexes, together with a halide promoter.

This is a continuation of application Ser. No. 752,794 (now abandoned) filed Aug. 15, 1968, which was a continuation-in-part of our copending application Ser. No. 628,578 (now abandoned) and Ser. No. 628,581 (now abandoned), both Ser. No. 628,578 and Ser. No. 628,581 having been filed on Apr. 5, 1967.

This invention relates to a process for the preparation of monocarboxylic acids. More particularly, it relates to a process for the reaction of compounds such as alcohols substituted at the alpha carbon atom, having the formula R—$CH_2OH$, and having 2 to 30 carbon atoms, where R is phenyl or hydroxymethyl; and halogen derivatives thereof in which the OH radical is substituted by Cl, Br, or I; ester derivatives thereof in which the carboxylic acid moiety of the ester has from 1 to 20 carbon atoms; and ether derivatives thereof; with carbon monoxide in the presence of catalyst compositions essentially comprising rhodium or iridium compounds and complexes, together with a halide promoter, to yield monocarboxylic acids selectively and efficiently.

Carbonylation processes for the preparation of carboxylic acids from alcohols are well known in the art and have been directed especially to the production of acetic acid. The prior art teaches the use of a number of catalysts for the synthesis of carboxylic acids by reaction of alcohols with carbon monoxide at elevated temperatures and pressures in both gas phase, fixed bed reactions and liquid phase reactions. Catalysts such as phosphoric acid, phosphates, activated carbon, heavy metal salts such as zinc and cuprous chlorides, silicates of various metals, and boron trifluoride in various hydration states have been reported to function for the production of carboxylic acids by reaction of alcohols and substituted alcohols with carbon monoxide at elevated temperatures and pressures of the order of 400° C. and 10,000 p.s.i.g., respectively. However, even under such severe conditions the yields of acid were substantially poor, and, therefore, uneconomical. Somewhat less severe reaction conditions of temperature and/or pressure have been reported in the literature employing specific catalyst compositions, e.g., 330°–340° C. and 2,250 p.s.i.g. using liquid phosphoric acid containing copper phosphate; 300° C.–500° C. and 2,000–4,000 p.s.i.g. using active charcoal impregnated with phosphoric acid; and 260° C.–360° C. and 2,800 p.s.i.g.–15,000 p.s.i.g. using metal carbonyls, such as iron, cobalt and nickel in conjunction with their halides or free halogens in the liquid phase. Even using these specific catalyst compositions at the less severe reaction conditions, substantially poorer yields of the desired carboxylic acid product and substantially slower reaction rates are obtained than those achieved in the process of this invention.

Certain disadvantages present in the carbonylation processes described in the prior art are catalyst instability, lack of product selectivity, and low levels of catalyst reactivity. One particular disadvantage of carbonylation processes of the prior art is their dependence upon the use of catalysts comprised of metal carbonyls or certain modified metal carbonyls including dicobalt octacarbonyl, iron carbonyl and nickel carbonyl, all of which require the use of high partial pressures of carbon monoxide to remain stable under the necessarily high reaction temperatures employed. For example, dicobalt octacarbonyl requires partial pressures of carbon monoxide as high as 3,000 p.s.i.g. to 10,000 p.s.i.g. under normal carbonylation conditions of 175° C. to 300° C.

Still another disadvantage of carbonylation processes disclosed in the prior art is their relatively low level of activity. This low level of activity requires higher catalyst concentrations, longer reaction times, and higher temperatures to obtain substantial reaction rates and conversions. Consequently, very large and costly processing equipment is required.

Another disadvantage of carbonylation processes disclosed heretofore is their inability to maintain high selectivity to the desired carboxylic acid at temperatures required for high conversion levels and high reaction rates. At these higher temperatures undesirable by-products comprising substantial amounts of ethers, aldehydes, higher carboxylic acids, carbon dioxide, methane and water are formed, thereby resulting in substantial yield losses and necessitating additional product purification and recycle steps in the processing.

Another disadvantage of carbonylation processes described in the prior art is their dependence on catalyst systems which require the use of substantially chemically pure carbon monoxide feedstocks to maintain high selectivity and high yield to the desired carboxylic acid product. For example, certain cobalt and nickel containing catalyst systems described heretofore when employed with carbon monoxide feed streams containing impurities such as hydrogen, result in the production of a number of undesirable by-products including methane, carbon dioxide, aldehydes, alcohols of the same carbon number as the desired carboxylic acid, and carboxylic acids of higher carbon number than desired. Consequently, substantial loss in selectivity and yield to the desired carboxylic acid occurs. Catalysts of the prior art cause the formation of troublesome gaseous by-products such as carbon dioxide and methane in the reactor system, thereby suppressing the carbon monoxide partial pressure and ultimately causing a decrease in the desired carbonylation reaction rate. Often additional processing steps are required to remove these undesirable by-products, necessitating the use of larger and costlier processing equipment.

It is therefore, an object of the present invention to overcome the above disadvantages and thus provide an improved and more economically and commercially feasible carbonylation process for the production of organic acids and their esters in liquid phase and vapor phase processes.

Another object of this invention is to provide a more reactive and more stable carbonylation catalyst composition than has been heretofore described in the prior art.

Still another object of the present invention is to provide a more selective and more reactive carbonylation catalyst composition for the production of monocarboxylic acids.

Another object of the present invention is to provide a carbonylation catalyst composition which results in the production of a higher yield of the desired monocarboxylic acid with no substantial formation of carbon dioxide, methane, water, dicarboxylic acids and other undesirable by-products.

Still another object of the present invention is the provision of an improved carbonylation process enabling the efficient and selective production of monocarboxylic acids by reaction of substituted alcohols such as benzyl alcohols to yield phenylacetic acids; 1,2-ethylene glycol to yield propionic acid; 1,2-propylene glycol to yield butyric acid; methylbenzyl alcohol to yield tolylacetic acid; and derivatives of substituted alcohols such as ethylene oxide to yield propionic acid; benzyl iodide to yield phenylacetic acid; 2-methyoxyethanol and 1,2-dimethoxyethane to yield propionic acid; and 1,2-butyleneoxide to yield valeric acid. It is noted that the vicinal glycols, although providing two reaction sites, yield only a monocarboxylic acid product.

The starting alcohols are reacted with carbon monoxide in the presence of an improved and more stable catalyst, thus enabling the use of lower catalyst concentration, lower temperature, lower pressure, and shorter contact time than has been generally possible heretofore and facilitating product isolation, catalyst recovery and recycle without substantial catalyst decomposition and loss. The present catalyst may be employed using a solution of the catalyst (liquid phase operation), or a solid catalyst (vapor phase operation).

These and other objects of the present invention will become apparent to those skilled in the art from the accompanying description and disclosure.

In accordance with a preferred embodiment of the present invention, alcohols substituted at the alpha carbon atom, having the formula R—$CH_2OH$, where R is a group selected from the class consisting of phenyl, hydroxymethyl and derivatives thereof, are converted selectively to a monocarboxylic acid having one more carbon atom, by reacting the alcohol or alcohol derivative in the liquid phase with carbon monoxide at temperatures from about 125° C. to 250° C. and at partial pressures of carbon monoxide from 5 p.s.i.g. to 5,000 p.s.i.g., preferably 75 p.s.i.g. to 1,000 p.s.i.g., although higher pressure may be employed, in the presence of a catalyst system comprised of an active portion, for example, a rhodium containing component, and a promoter portion, for example, a halogen and/or halogen compounds, preferably bromine or iodine. The present process is particularly advantageous at lower pressures, although higher pressures may also be used.

As referred to above, for the purpose of the present invention, the catalyst as charged to the reactor is a solution containing a preformed Rh or Ir component containing a halogen promoter and other moieties if desired. The catalyst preferably includes a Rh or Ir component containing a halogen promoter, as the active component, such as $[Rh(CO)_2I]_2$, $[(n-Bu)_4P][Rh(CO)_2I_2]$, $[Ir(CO)_2Cl]_2$, $RhI_3$, $RhBr_3$, $[(C_6H_5)_3P]_2Rh(CO)I$,
$[Rh(CO_2Br]_2$, $[(C_6H_5)_3P]_2Rh(CO)(Cl)(CH_3I)$,
$[(C_6H_5)_3As]_2Rh(CO)Br$, $[(n-Bu)_4N][Rh(CO)I_4]$,
$[(C_6H_5)_3AsCH_3][Rh(CO)_2(I)_2]$, etc. The halogen promoter portion of the present catalyst system may or may not be catalytically active in itself, but promotes the reaction in various ways, such as by facilitating cleavage of the carbon-oxygen bond in the alcohol, or by rendering the rhodium species less volatile than the unmodified rhodium carbonyl.

The active catalytic portion of first component of the preformed catalyst is prepared from the rhodium or iridium species, e.g., rhodium metal, simple rhodium salts, organorhodium compounds, and coordination compounds of rhodium, specific examples of which may be taken from the following partial list of suitable rhodium or iridium precursors:

Rh metal
$IrCl_3 \cdot 3H_2O$
$RhBr_3$
$RhI_3$
$RhCl_3 \cdot 3H_2O$
$RhBr_3 \cdot 3H_2O$
$Rh_2(CO)_4Cl_2$
$Rh_2(CO)_4Br_2$
$Rh_2(CO)_4I_2$
$Ir(CO)Cl(P\phi_3)_2$,
$Rh[(C_6H_5)_3P]_2(CO)I$
$Rh[(C_6H_5)_3P]_2(CO)Cl$
$RhCl[(C_6H_5)_3P]_2(CH_3I)_2$
$Rh(SnCl_3)[(C_6H_5)_3P]_3$
$RhCl(CO)[(C_6H_5)_3As]_2$
$RhI(CO)[(C_6H_5)_3Sb]_2$
$[Ir(CO)_2Cl]_2$
$[(n-C_4H_9)N][Rh(CO)_2X_2]$ where X=Cl⁻, Br⁻, I⁻
$[(n-C_4H_9)_4As]_2[Rh_2(CO)_2Y_4]$ where Y=Br⁻, I⁻
$[(n-C_4H_9)_4P][Rh(CO)I_4]$
$Rh[(C_6H_5)_3P]_2(CO)Br$
$Rh[(n-C_4H_9)_3P]_2(CO)Br$
$Rh[(n-C_4H_9)_3)_2P]_2(CO)I$
$RhBr[(C_6H_5)_3P]_3$
$RhI[(C_6H_5)_3P]_3$
$RhCl[(C_6H_5)_3P]_3$
$RhCl[(C_6H_5)_3P]_3H_2$
$[(C_6H_5)P]_3Rh(CO)H$
$Rh[(C_2H_4)_2Cl]_2$
$K_4Rh_2Cl_2(SnCl_3)_4$
$K_4Rh_2Br_2(SnBr_3)_4$
$K_4Rh_2I_2(SnI_3)_4$
$Rh_2O_3$
$IrO_2$
$Rh(NO_3)_3$ The active catalytic portion or primary component of the catalyst system of this invention, as a solution, or as a supported solid catalyst, may exist as a coordination compound of Rh or Ir, carbon monoxide, and a halide (X) such as chloride, bromide and iodide,

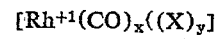

where $x+y=4$, including both neutral and ionic complexes, or a coordination compound,

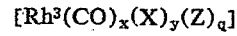

where $x+y+q=5$ or 6, which includes other suitable ligands (Z), if desired, as amine, organophosphine, organoarsine, and/or organostibine ligands, other ligands, e.g., hydride; alkyl, acyl, and aryl (1–20 carbon atoms); and triahalostannate or any neutral, cationic, or anionic moiety necessary to satisfy the coordination number of the central metal atom, rhodium, and thus form a coordination compound or complex of rhodium as described above.

Preferred catalyst systems for the process of this invention are typically coordination complexes of rhodium, carbon monoxide and iodide, such as $[Rh(CO)_2I_2]^-$, $[Rh(CO)I_4]^-$, or $[Rh(CO)_2I]_2$.

The term coordination compound or coordination complex used throughout this specification means a compound or complex formed by combination of one or more electronically rich molecules or atoms capable of independent existence with one or more electronically poor molecules or atoms, each of which may also be capable of independent existence.

The promoting portion or second component of the catalyst system consists of a halogen and may be supplied as a halogen compound such as hydrogen halide, alkyl- or aryl-halide, metal halide, ammonium, phosphonium, arsonium, stibonium halide, etc., and may be the same or different from any halogen component already present in the precursor Rh or Ir component of the catalyst system. Halogen or halide compounds are suitable for the promoter portion of the catalyst, but those containing iodine and bromine are preferred, with hydrogen iodide constituting a more preferred member. Accordingly, suitable compounds providing the promoter portion of the catalyst system of this invention may be selected from the following list of preferred halogen and/or halogen containing compounds:

$RX_n$ where R=any alkyl-, alkylene- or aryl-group ($n$ is 1 to 3) and X=Cl, Br, or I, e.g., $CH_3I$, $C_6H_5Br$, $CH_3CH_2I$, $ICH_2CH_2I$, etc.

$X_2$ or $X_3^-$ where X=Cl, Br, or I, e.g., $Br_2$, $I_2$, $I_3^-$, etc.

HX where X=Cl, Br, or I, e.g., HBr, HI

where R=any alkyl- or aryl-group and X=Cl, Br, or I, e.g.,

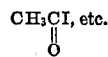

$R_4MX$, $R_4MX_3$, or $R_3MX_2$ where R=hydrogen or any alkyl- or aryl-group, M=N, P, As or Sb, X=Cl, Br or I, e.g., $NH_4I$, $PH_4I_3$, $PH_3I_2$, $PH_3Br_2$, $(C_6H_5)_3PI_2$, and/or combinations of R, M and X The promoter portion or second component of the catalyst may alternatively be charged to the reactor separately from the active catalyst or first component, or it may be incorporated into the active component, e.g., $RhI[(C_6H_5)_6P]_3$. The rhodium compound or first component of the catalyst system may be prepared prior to charging the reactor or generated *in situ*. Subsequently, after the first component is in the reactor and dissolved in a suitable solvent, the promoter or second component of the catalyst may be added as a solid or liquid compound, or in a solution in a suitable solvent compatible with that already employed in the process of this invention. However, the promoter portion of the catalyst may also be incorporated in the active catalyst or first component either during the preforming or during the *in situ* generation of the metal complex.

The preparation of the active catalyst complex which includes both rhodium and halogen promoter components may be accomplished by a variety of methods. However, it is thought that a substantial part of the precursor rhodium component is converted to the monovalent state during the preparative treatment. In general, in the process of this invention, it is preferable to preform the active carbonylation catalyst system which contains both rhodium and halogen promoter components. For example, to prepare the catalyst system, the first component of the catalyst system, e.g., finely divided rhodium metal (powder), a simple rhodium salt or rhodium compound as a precursor is dissolved in a suitable medium, and carbon monoxide is bubbled through the above rhodium solution, preferably while maintaining gentle heating and stirring of the rhodium solution. Then an acidic solution of the desired halogen promoter is added to form an active catalytic solution containing the necessary rhodium and halogen promoter components.

Generally, any preformed rhodium compound may be charged to the reactor directly and, if desired, is dissolved in an appropriate solvent. If desired, the rhodium coordination compounds described above may be prepared from any of the simpler types of rhodium salts. For example, to prepare the catalyst system, the first component of the catalyst system, e.g., a rhodium salt such as $RhCl_3 \cdot 3H_2O$ is dissolved in a suitable solvent such as ethanol. Subsequently, carbon monoxide is bubbled through the solution where an intermediate, such as the dimer $[Rh(CO)_2Cl]_2$, is produced wherein the rhodium is in the monovalent state. The second or promoter component is, for example, added to the above solution, e.g., as aqueous HI, or methyl iodide or other halogen containing compound.

Alternatively, the rhodium precursor, e.g., $RhCl_3 \cdot 3H_2O$ or $Rh_2O_3 \cdot 5H_2O$, may be dissolved in a dilute aqueous acid solution, e.g., HCl, acetic acid, etc., as solvent. Then the solution of the rhodium compound is heated, for example, to 60° C.–80° C., or in general at a temperature below the boiling point of the solvent, with stirring. A reducing agent such as carbon monoxide is bubbled through the said solution to obtain the rhodium component at least in part in the monovalent state. The halogen promoter is added as described herein, although the halogen containing promoter may also be added first.

Another embodiment of the present invention employs compounds of monovalent rhodium initially, wherein the transformation to active catalyst does not involve a change of valence. For example, monovalent rhodium salts such as $Rh[(C_6H_5)_3P]_3Cl$, $[Rh(C_6H_5)_3P]_2(CO)Cl$, and $[Rh(C_6H_5)_3P]_3H$ are dissolved in a suitable solvent and carbon monoxide is subsequently passed through a solution that is preferably warmed and stirred. Subsequent addition of an acidic solution of the halogen promoter, e.g., methyl iodide, methyl bromide, aqueous HI, HBr, etc., results in formation of an active carbonylation catalyst solution containing the necessary rhodium and halogen components.

Alternate embodiments of the present invention include use of other rhodium components in various oxidation states, e.g., rhodium metal (zero valence state), rhodium salts, e.g., $RhI_3$ (+3 valence state), other rhodium compounds, e.g., trisacetylacetonato rhodium (III) (+3 valence state), etc.; with suitable chemical reagents to accomplish the desired transformation to the monovalent rhodium state. Such reagents include reducing agents, e.g., hydrogen, carbon monoxide, hydrazine, formic acid, phenylhydrazine, etc.; and oxidizing agents, e.g., elemental halogens ($I_2$ or $Br_2$), mineral acids, (HCl, HBr, $HNO_3$, HI), peroxides ($H_2O_2$, cumene hydroperoxide, etc.).

This catalytic solution containing the necessary rhodium and halide components is then ready for use as discussed above. Often it may be beneficial and desirable to have the concentration of the second component or promoter portion of the catalyst system, for example, iodide such as HI or $CH_3I$, in excess of that required to form a stoichiometric compound such as described above. In the same way the two components, e.g., a rhodium compound and an iodine or bromine component are provided in a single molecule by beginning with rhodium triiodide or rhodium tribromide as the catalyst precursor for the reaction of an alcohol with carbon monoxide to produce an organic acid. The present discussion is based upon the catalyst precursors as charged. The ultimate nature of the catalyst as modified by reaction conditions, and the presence of promoters and reactants has not been completely elucidated. However, it has been found that the use of the components described herein provides a highly superior catalyst and process for the production of carboxylic acids.

Although any ratio of promoter portion or second component of the catalyst system may be employed, ratios of promoter portion of active portion expressed as atoms of halogen in the promoter portion to atoms of rhodium in the active portion of the catalytic system in the range of 1:1 to 2500:1 are generally employed. However, the preferred range is 3:1 to 300:1 halogen atoms per rhodium atom.

The liquid reaction medium employed may be any solvent compatible with the catalyst system and may include pure alcohols, or mixtures of the alcohol feedstock and/or the desired carboxylic acid and/or esters of these two compounds or other carboxylic acids such as acetic acid. The preferred solvent and liquid reaction medium for the process of this invention is a monocarboxylic acid having 2–6 carbon atoms, e.g., acetic, propionic, butyric, pentanoic and hexanoic acids, including isomeric forms. Water may also be added to the reaction mixture to exert a beneficial effect upon the reaction rate. Other liquid phase reaction media may be chosen such as the organophosphorus ligands employed in preparation of the catalyst system. An example of such a ligand which may function as the liquid reaction medium and/or solvent is triphenylphosphite.

Examples of preferred feedstocks employed for the carbonylation reaction of the present invention include the group of substituted alcohols such as benzyl alcohol to yield phenylacetic acid; 1,2-ethylene glycol to yield propionic acid; 1,2-propylene glycol to yield butyric acid; methylbenzyl alcohol to yield tolylacetic acid; and derivatives of substituted alcohols such as ethylene oxide to yield propionic acid; benzyl iodide to yield phenylacetic acid; 2-methoxyethanol and 1,2-dimethoxyethane to yield propionic acid; 1,2-butyleneoxide to yield valeric acid; benzylacetate to yield phenylacetic acid and ethylenechlorohydrin to yield propionic acid.

The carbonylation reaction may be carried out by intimately contacting an alcohol or alcohol derivative, as set forth above, which depending on the carbon number and operating conditions may either be in the vapor or liquid phase, with gaseous carbon monoxide in a liquid phase containing the catalyst system prepared from $RhCl_3 \cdot 3H_2O$ or other rhodium components as precursor, preferably in the presence of halogen containing promoter, such as hydrogen iodide, under conditions of temperature and pressure suitable as described herein to form the carbonylation product. The particular conditions selected are the same whether the feedstock is charged as a vapor or liquid. The temperature accordingly will be in the range of 125° C. to 250° C. with the preferred range being 165° C. to 225° C. Partial pressures of carbon monoxide of the order of 5 p.s.i.g. to 5,000 p.s.i.g. may be employed; however, 75 p.s.i.g. to 1,000 p.s.i.g. carbon monoxide partial pressure is generally preferred. Higher pressures may be used if desired under appropriate conditions.

Alternatively, carboxylic acids may be produced if desired via reaction of the substituted alcohols or alcohol derivatives, together with carbon monoxide in the vapor phase over the rhodium containing catalyst systems described above, dispersed upon inert supports. Such a catalyst system may be operated as a conventional fixed bed catalytic reactor. For example, ethylene oxide, hydrogen iodide, and carbon monoxide may be passed over a catalyst system consisting, for example, of $[Rh(CO)_2Cl]_2$ dispersed on an inert support material such as Alundum, activated carbon, clays, alumina, silicia-alumina, and ceramics, etc., in a fixed bed reactor maintained at elevated temperature and pressure, as described above, to produce propionic acid in high yield. However, use of a liquid reaction medium is preferred in the process of this invention using dissolved or dispersed active catalytic and promoter component.

A typical carbonylation reaction selective to monocarboxylic acid requires at least one mole of carbon monoxide per mole of substituted alcohol or alcohol derivative. Excess of carbon monoxide over the aforesaid stoichiometric amount, however, may be present. Carbon monoxide streams containing inert impurities such as hydrogen, carbon dioxide, methane, nitrogen, noble gases, water and paraffinic hydrocarbons having from 1 to 4 carbon atoms, may be employed, if desired, for example, from an available plant gas stream, with no ill effect; however, in such cases total reactor pressure will have to be increased to maintain a desired carbon monoxide partial pressure. The concentration of carbon monoxide in the feed gas mixture is from 1 vol. percent to 99.9 vol. percent, a preferred range being from 10 vol. percent to 99.9 vol. percent.

The reaction rate is dependent upon catalyst concentration and temperature. Concentrations of the rhodium compound or the first component of the catalyst system in the liquid phase between $10^{-0}$ moles/liter and $10^{-1}$ moles/liter, are normally employed, with the preferred range being $10^{-4}$ moles/liter to $10^{-2}$ moles/liter. Higher concentrations even to the extent of 1 mole/liter may, however, be used if desired. Higher temperatures also favor higher reaction rates.

The concentration of the second component or promoter portion of the catalyst system may vary widely over the broad concentration range of $10^{-6}$ moles/liter to 18 moles/liter, based on halogen atoms. In the process of this invention, however, the preferred concentration range of promoter is $10^{-4}$ moles/liter to 2 moles/liter of catalyst solution.

The active rhodium catalytic component is preferably supplied as a catalyst solution. The solution can also include liquid reactants, products and mixtures thereof which function as solvents or reaction media.

When an ester or half-ester of the substituted alcohol is present in the feedstock, such as 2-methoxyethanol or 1,2-dimethoxyethane, it is normally charged with equimolar amounts of water, although more or less water may be used. The use of the ester is on the basis that a molar quantity of water is present equivalent to the number of equivalents of ester present. It has been found that water generally exerts a beneficial effect on the rate of reaction. However, adding water, with the feed in excess of the equimolar quantity, e.g., an excess of 50% to 300% of such equimolar quantity, already present with ester, as discussed above, promotes the production of acid.

The rhodium catalysts of the present invention are characterized by a high degree of specificity for the carbonylation reaction, e.g., the reaction of alcohol groups with carbon monoxide to obtain monocarboxylic acids such as benzyl alcohol or vicinal glycols to yield monocarboxylic acids. Such control over the various competing reactions to obtain the monocarboxylic acid in high yield, with the repression of dicarboxylic acid formation, is surprising since other metal catalysts do not show such specificity. The iron group metals such as iron, cobalt and nickel differ from the present rhodium catalysts in that the iron group metals simultaneously catalyze hydrogenation reactions to a very high degree. Furthermore, the iron group catalysts, particularly cobalt and nickel, require a far higher carbon monoxide partial pressure to remain stable. When moderate pressures, e.g., less than about 2,000 p.s.i.g. carbon monoxide partial pressure are employed, at a temperature of 175° C., the cobalt catalyst is found to plate out or decompose to the free metal which plates on the walls of the reactor and is thus lost as a catalyst. In addition, the iron group catalysts when employed with vicinal glycol feedstocks, e.g., 1,2-ethylene glycol, result in formation of large proportions of dicarboxylic acids such as succinic acid.

Another distinction of the rhodium catalysts over the cobalt catalysts is the elimination of undesirable gaseous by-products, including carbon dioxide and methane which are obtained as a result of the water-gas shift reaction which is strongly catalyzed by cobalt.

The discussion herein relating to production of carboxylic products includes production of derivatives, such as esters by reaction of the desired carboxylic acid with an alcohol moiety which may be the same or different from the feedstock, and is carried out in situ in the reactor by control of alcohol conversion or accomplished separately by subsequent reaction in a separate vessel.

For a better understanding of the process of the present invention specific embodiments of the process are presented below. These examples and illustrations are not to be construed in any way as limiting the scope of the invention.

EXAMPLE 1

A batch reactor is charged with the following ingredients: 0.396 grams of a rhodium compound having the formula $RhCl_3 \cdot 3H_2O$, 51 grams of a promoter consisting of aqueous 57 wt. percent hydriodic acid, 196.9 grams of acetic acid as a solvent, and 100 grams of benzyl alcohol as feedstock.

The reactor is pressurized with carbon monoxide to a total pressure of 1,000 p.s.i.g., corresponding to a carbon monoxide partial pressure of about 800 p.s.i.g., at the reaction temperature of 175° C. The reaction is carried out at constant pressure. The reaction products are subsequently analyzed by gas chromatographic techniques.

The selectivity to the formation of the desired carboxylic acid product, phenylacetic acid, is greater than 85 mol percent. No substantial amounts of by-products such as aldehydes, higher boiling carboxylic acids, methane, or carbon dioxide are formed.

When this experiment is conducted with the equivalent molar quantity of cobalt chloride instead of rhodium chloride as the catalyst, the selectivity and yield of the desired acid product are decreased significantly. It has been found that cobalt catalysts differ radically from rhodium catalysts in that the cobalt catalysts also cause hydrogenation reactions such as hydrogenation of the desired carboxylic acid product to aldehydes and alcohols of the same number of carbon atoms. Consequently, the use of cobalt catalysts results in the substantial production of various undesirable by-products including higher carbon number alcohols, carboxylic acids, and derivatives.

Still another distinction of the rhodium catalysts compared to the cobalt and nickel catalysts is the fact that significantly lower carbon monoxide partial pressure can be used without encountering catalyst decomposition.

EXAMPLES 2–12

The procedure of Example 1 is also followed in detailed Examples 2–12, in order to illustrate the variation of parameters. Data of these runs are shown in the accompanying table, including variation of catalyst components, feedstock, and reaction conditions along with results for product selectivity.

bled through the solution until a pale yellow color is obtained indicating the presence of the monovalent complex. Then the solution is cooled and 20 ml. of 57 wt. percent hydriodic acid is added to the solution of the iridium compound. Subsequently, the resulting solution is added to 20 ml. of an activated carbon (Pittsburgh Activated Carbon Co.). The excess solvent is evaporated using a rotary evaporator under vacuum. The resulting catalyst is vacuum dried at 60° C. for about 16 hours. The catalyst is then preheated in nitrogen at 200° C. for one hour.

Ten (10) ml. of the above supported catalyst is charged into an 18-inch Pyrex glass vertical reactor 30 mm. in diameter. The resulting catalyst bed, 2 cm. in depth, is covered with 100 ml. of inert packing as a preheater. Gaseous ethylene oxide is supplied to the reactor and is subsequently converted to propionic acid at high selectivity. The process is conducted at a feed rate (moles per hour) of ethylene oxide, 0.14; HI, 0.02; water, 0.26; and CO, 0.54. The pressure at which the gaseous reactants contact the supported catalyst is 500 p.s.i.g., corresponding to a carbon monoxide partial pressure of about 125 p.s.i.g. at a reaction temperature of 175° C.

The gaseous reactor effluent contains the desired carboxylic acid product, propionic acid, and unreacted ethylene oxide, water, carbon monoxide and promoter. The selectivity of ethylene oxide conversion to propionic acid is virtually quantitative.

When this example is repeated except that hydrogen gas is used as a 50 vol. percent diluent in the feedstream, similar results are obtained.

What is claimed is:

1. A process for the carbonylation of reactants selected from the group consisting of 1,2-propyleneglycol, 2-methoxyethanol, 1,2 - dimethoxyethane, 1,2 - dihydroxypentane, 1,2-butyleneoxide, propyleneoxide and ethyleneoxide and compounds having the formula $R-CH_2OH$, $R-CH_2Cl$, $R-CH_2Br$ and $R-CH_2I$ wherein R is hydroxymethyl, said process comprising contacting
   (1) at least one of said reactants,
   (2) carbon monoxide, and
   (3) a catalyst system consisting essentially of
      (a) a metal compound, and
      (b) a halogen component

TABLE

Run conditions: [Rh or Ir] ×10⁻³M; [Br or I] 0.6 M; 50 ml. solvent; Time: 17 hours

| Example | Feedstock | Catalyst precursor Rh | Promoter | Solvent | Temp., °C. | Reactor press, p.s.i.g. | Major product selectivity (mol%) |
|---|---|---|---|---|---|---|---|
| 2 | $HO(CH_2)_2OH$ | $RhCl_3 \cdot 3H_2O$ | HI | $CH_3COOH$ | 175 | 700 | $CH_3CH_2COOH$ (95)* |
| 3 | $HOCH_2CHCH_3$ $\mid$ $OH$ | $RhCl_3 \cdot 3H_2O$ | HI | $CH_3COOH$ | 200 | 1,000 | [$CH_3CH_2CH_2COOH$ / $CH_3CHCOOH$ $\mid$ $CH_3$] - (95)* |
| 4 | $CH_2O(CH_2)_2OH$ | $[Rh(CO)_2Cl]_2$ | HI | $CH_3COOH$ | 215 | 1,100 | $CH_3CH_2COOH$ (47)* |
| 5 | $HOCH_2CH(CH_2)_2CH_3$ $\mid$ $OH$ | $Rh(P\phi_3)_2COCl$ | $CH_3I$ | $CH_3CH_2COOH$ | 200 | 1,000 | [$CH_3(CH_2)_3COOH$ / $CH_3(CH_2)_3CHCOOH$ $\mid$ $CH_3$] - (65)* |
| 6 | $\phi CH_2OH$ | $[Ir(CO)_2Cl]_2$ | HI | $CH_3COOH$ | 175 | 700 | $\phi CH_2COOH$ (83)* |
| 7 | $\phi CH_2OH$ | $RhCl_3 \cdot 3H_2O$ | HI | $CH_3COOH$ | 140 | 500 | $\phi CH_2COOH$ (90)* |
| 8 | $\phi CH_2I$ | $[Rh(CO)_2Br]_2$ | HI | $CH_3CH_2COOH$ | 175 | 300 | $\phi CH_2COOH$ (83)* |
| 9 | $CH_2\text{---}CH\text{---}CH_3$ \\O/ | $Rh(NO_3)_3 \cdot 2H_2O$ | $CaI_2 \cdot 3H_2O$ | $CH_3COOH$ | 200 | 1,000 | [$CH_3CH_2CH_2COOH$ / $CH_3CHCOOH$ $\mid$ $CH_3$] - (88)* |
| 10 | $ClCH_2CH_2OH$ | $Rh(P\phi_3)_3Cl$ | HI | $CH_3CH_2COOH$ | 200 | 800 | $CH_3CH_2COOH$ (93)* |
| 11 | $CH_3\phi CH_2OH$ | $Rh_2O_3$ | HBr | $CH_3COOH$ | 165 | 600 | $CH_3\phi CH_2COOH$ (82)* |
| 12 | $HO(CH_2)_3OH$ | $RhCl_3 \cdot 3H_2O$ | HI | $CH_3COOH$ | 140 | 500 | Monocarboxylic acid (about 1). $HOOC(CH_2)_3COOH$ (30) |

*No dicarboxylic acids formed as determined by chromatographic analysis.

EXAMPLE 13

A solid supported catalyst containing an iridium component and a halogen promoter dispersed upon an inert support is prepared in the following manner: An amount of 0.6 g. of an iridium compound, having the formula $IrCl_3 \cdot 3H_2O$, is dissolved in 2-methoxy ethanol. The solution is warmed to 60° C., and carbon monoxide is bubwherein during said contacting, said metal compound and said halogen component are present in an amount sufficient to catalyze the carbonylation of said reactants, said contacting being carried out at a temperature in the range of 125 o 250° C. and a a carbon monoxide partial pressure in the range of 5 to 5,000 p.s.i.g., said metal compound of (3a) is selected from the group consisting of rhodium compounds and iridium compounds and said halogen component of (3b) is bromine, iodine, a bromide compound or an iodide compound.

2. The process of claim 1 wherein said contacting is also in the presence of water.

3. The process of claim 2 wherein at least a portion of said halogen component of (3b) is provided by hydrogen iodide, hydrogen bromide, methyl iodide or methyl bromide.

4. The process of claim 2 wherein said metal compound of (3a) is provided by a material selected from the group consisting of iridium salts, rhodium salts, iridium oxides and rhodium oxides.

5. The process of claim 2 wherein said halogen component of (3b) is provided by iodine or an iodide compound and said iodine or iodide compound is present in an amount such as to produce an iodine to iridium or an iodine to rhodium atomic ratio in the range of 1:1 to 2500:1.

6. The process of claim 5 wherein said metal compound of (3a) is dispersed upon an inert solid support.

7. The process of claim 6 wherein said carbonylation is carried out with said reactants in the vapor phase.

8. The process of claim 2 wherein said metal compound of (3a) and said halogen component of (3b) are present in a liquid reaction medium.

9. The process of claim 8 wherein said metal compound of (3a) is an iridium compound.

10. The process of claim 9 wherein the halogen component of (3b) is present in an amount of from 1:1 to 2500:1 atoms of halogen per atom of iridium.

11. The process of claim 9 wherein said halogen component of (3b) is iodine or an iodide compound.

12. The process of claim 8 wherein said metal compound of (3a) is a rhodium compound.

13. The process of claim 12 wherein the halogen component of (3b) is present in an amount of from 1:1 to 2500:1 atoms of halogen per atom of rhodium.

14. The process of claim 13 wherein said halogen component of (3b) is iodine or an iodide compound.

15. The process of claim 1 wherein said metal compound of (3a) is dispersed upon an inert support.

16. The process of claim 15 wherein said contacting is carried out with the reactants in the vapor phase.

17. The process of claim 16 wherein said metal compound of (3a) is an iridium compound.

18. The process of claim 16 wherein said metal compound of (3a) is a rhodium compound.

References Cited

UNITED STATES PATENTS

| | | | |
|---|---|---|---|
| 2,710,878 | 6/1955 | Glasebrook | 260—532 |
| 3,020,314 | 2/1962 | Alderson | 260—533 |
| 3,338,961 | 8/1967 | Classon et al. | 260—514 |
| 3,367,961 | 2/1968 | Brewbaker | 260—486 |
| 2,739,169 | 3/1956 | Hagemeyer, Jr. | 260—532 |
| 3,065,242 | 2/1962 | Alderson et al. | 260—532 |
| 3,168,553 | 2/1965 | Slaugh | 260—488 K |
| 3,579,551 | 5/1971 | Craddock et al. | 260—533 |

OTHER REFERENCES

Tsuji et al.: J.A.C.S., vol. 86, pp. 4350–4353, October 1964.

VIVIAN GARNER, Primary Examiner

U.S. Cl. X.R.

260—476 R, 488 K, 493, 496, 515 R, 540